United States Patent [19]

Beauvais

[11] Patent Number: 5,366,269
[45] Date of Patent: Nov. 22, 1994

[54] APPARATUS FOR RESTRAINING A PASSENGER IN A VEHICLE

[75] Inventor: Randall R. Beauvais, Fenton, Mo.

[73] Assignee: Life Force Associates, L.P., Imperial, Mo.

[21] Appl. No.: 932,816

[22] Filed: Aug. 20, 1992

[51] Int. Cl.⁵ ............................................. B60N 2/42
[52] U.S. Cl. .............................. 297/216.19; 297/473
[58] Field of Search ................. 297/216.16, 216.19, 297/473

[56] References Cited

U.S. PATENT DOCUMENTS

| | | |
|---|---|---|
| 2,227,717 | 1/1941 | Jones . |
| 2,823,730 | 2/1958 | Lawrence . |
| 2,922,461 | 1/1960 | Braun . |
| 3,112,955 | 12/1963 | Stolz . |
| 3,162,479 | 12/1964 | Hewitt . |
| 3,170,728 | 2/1965 | Berenyi . |
| 3,193,327 | 7/1965 | Roe . |
| 3,245,718 | 4/1966 | Jasmer et al. . |
| 3,269,774 | 8/1966 | Hildebrandt et al. . |
| 3,301,592 | 1/1967 | McFarlane et al. . |
| 3,357,736 | 12/1967 | McCarthy . |
| 3,423,124 | 1/1969 | Hewitt . |
| 3,561,817 | 2/1971 | Needham . |
| 3,582,133 | 6/1971 | DeLavenne . |
| 3,610,679 | 10/1971 | Amala . |
| 3,845,836 | 11/1974 | Bendler et al. . |
| 3,942,819 | 3/1976 | Schwanz et al. . |
| 3,998,291 | 12/1976 | Davis . |
| 4,004,763 | 1/1977 | Bunnell, III et al. . |
| 4,130,255 | 12/1978 | Sasaki et al. . |
| 4,135,410 | 1/1979 | Filderman . |
| 4,159,120 | 6/1979 | Föhl . |
| 4,257,626 | 3/1981 | Adomeit . |
| 4,738,485 | 4/1988 | Rumpf . |
| 4,763,924 | 8/1988 | Karlin et al. . |
| 4,884,652 | 12/1989 | Vollmer . |
| 4,911,381 | 3/1990 | Cannon et al. . |
| 4,966,388 | 10/1990 | Warner et al. . |
| 5,022,707 | 6/1991 | Beauvais . |
| 5,110,182 | 5/1992 | Beauvais . |
| 5,294,184 | 3/1994 | Blake et al. .......................... 297/473 |

FOREIGN PATENT DOCUMENTS

3237167 4/1984 Germany .

Primary Examiner—Peter M. Cuomo
Assistant Examiner—Darnell M. Boucher
Attorney, Agent, or Firm—Kenyon & Kenyon

[57] ABSTRACT

An apparatus for restraining an object includes an anchor member movably coupled to a frame and a restraining member selectively coupleable about the object to maintain the object on an object support structure. The restraining member is coupled to the anchor member such that, upon a sudden acceleration of the frame, the anchor member moves from a rest position along at least a portion of a predetermined path so that the restraining member is gradually tightened about the object as the anchor member moves further from the rest position. The anchor member moves in response to an inertial force of the object which is transmitted to the anchor member via the restraining member.

27 Claims, 13 Drawing Sheets

APPARATUS FOR RESTRAINING A PASSENGER IN A VEHICLE

FIELD OF THE INVENTION

This invention relates to devices for restraining passengers in vehicles and more particularly relates to a device which tightens a restraining member around a passenger in the event of a collision of the vehicle.

BACKGROUND OF THE INVENTION

Issues concerning passenger safety have become increasingly important as the speed of the vehicles transporting these passengers has increased. In an attempt to reduce injuries due to the sudden accelerations produced in vehicle collisions, a number of passenger restraint systems have been employed. These restraint systems have commonly employed belts and/or harnesses which fasten about the passengers in order to achieve two primary objectives: (1) Maintaining the passenger's original orientation and position within the vehicle; (2) Absorbing the passengers' kinetic energy.

These restraint systems are most effective when the harness is highly tensioned about the passenger prior to the onset of the acceleration force which propels the passenger's body against the restraining harness. However, if applied to the harness at all times, this level of tension restricts the movement of the passenger and reduces passenger comfort.

Thus there is a need for a restraint system including a harness or belt which is immediately tensioned about a passenger in response to an acceleration of the vehicle which is potentially injurious to the passenger.

Known restraint systems have attempted to utilize power from an external source to tension restraint harnesses. However, these systems have employed sensors and a preset action threshold to activate the harness tensioning. Consequently, these systems are complex and expensive and display little flexibility as to the amount of belt tensioning effected in response to various accelerations.

Systems are known which utilize the inertial force of a movably mounted counterweight to tension the belt about the passenger. However, although the acceleration acting on the counterweight is identical to that acting on the passenger, such systems provide a tensioning force which is not proportional to the inertial force of the passenger. That is, because the mass of the counterweight is constant, these systems do not provide a tensioning force which varied in proportion to the inertial force of the passenger.

In addition, devices are known which utilize the motion of a passenger seat in response to a vehicular acceleration to drive a mechanism which tensions the seat belt. In these devices, the action of the seat motion on the belt anchors works in opposition to the passenger's inertial forces translated by the belt. The timing of these devices is inherently late, being responsive only after the accelerating force has become appreciable enough to cause significant seat motion, and hence has already caused the passenger to be heavily forced upon the harness. In fact, this timing delay can even magnify potential dangers. The risk of whiplash induced by recoil is increased. In addition, the force of the passenger on the belt prior to the tightening action may exhaust the belts elastic capacity to absorb energy from the passenger before the tightening action increases the belt tension to potentially hazardous levels.

Thus there is a need for a relatively simple restraint system which provides a timely tensioning force which is proportional to the inertial force of the passenger and which works in synchronization with, or without a moving seat.

SUMMARY OF THE INVENTION

The present invention is directed to an apparatus for restraining an object comprising an anchor member movably coupled to a frame and a restraining member selectively coupleable about the object to maintain the object on an object support structure. The restraining member is coupled to said anchor member such that upon the sudden acceleration of the frame, the anchor member moves, in response to an inertial force of the object translated by the restraining member, from a rest position along at least a portion of a predetermined path so that the restraining member is gradually tightened about the object as the anchor member moves further from the rest position and, wherein, the apparatus transmits the inertial force of the object to the anchor member via the restraining member.

DETAILED DESCRIPTION

Figure 1:
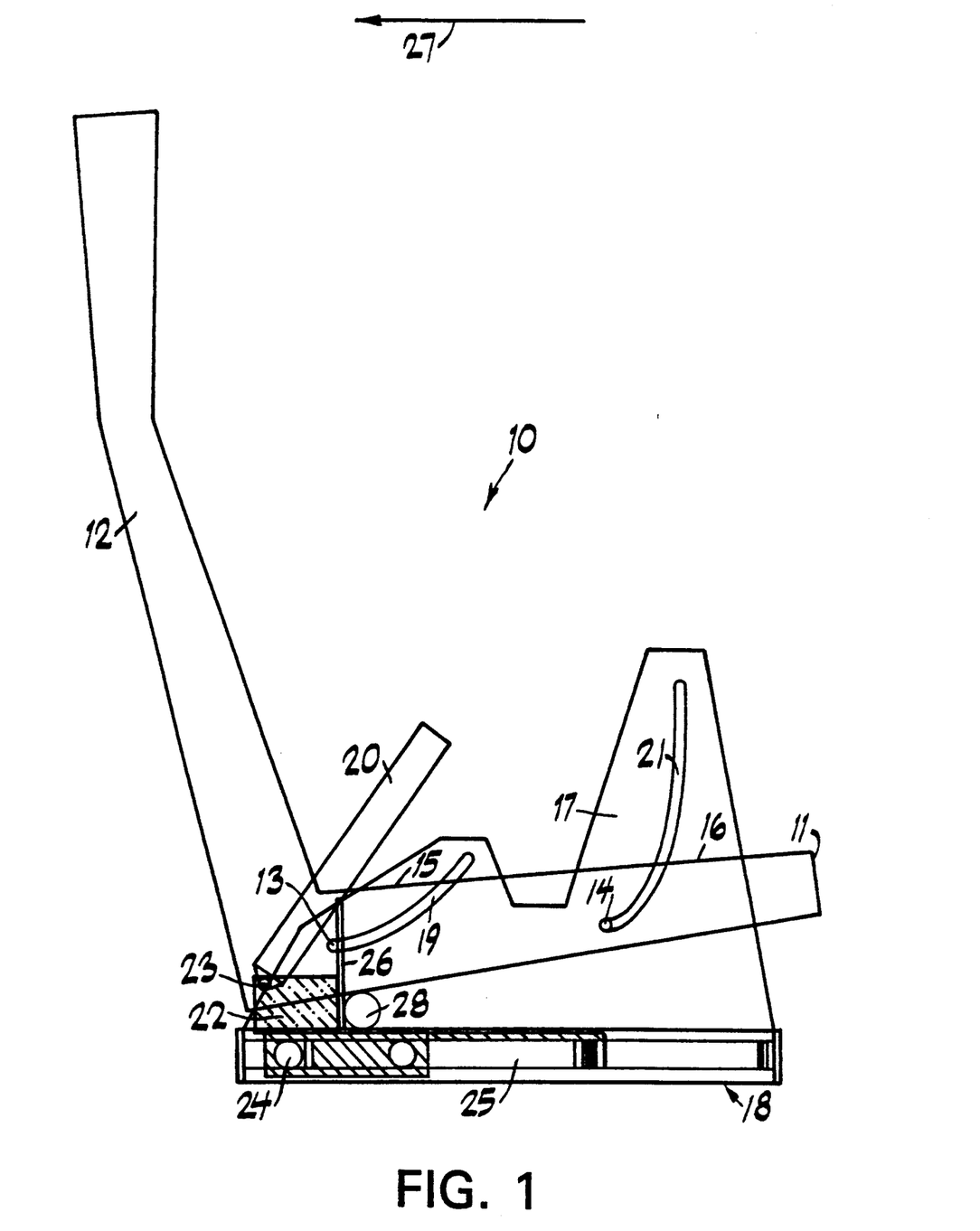
FIG. 1 shows a side view of a vehicle seat including an apparatus according to a first embodiment of the present invention wherein the vehicle seat is in a rest position.
Figure 2:
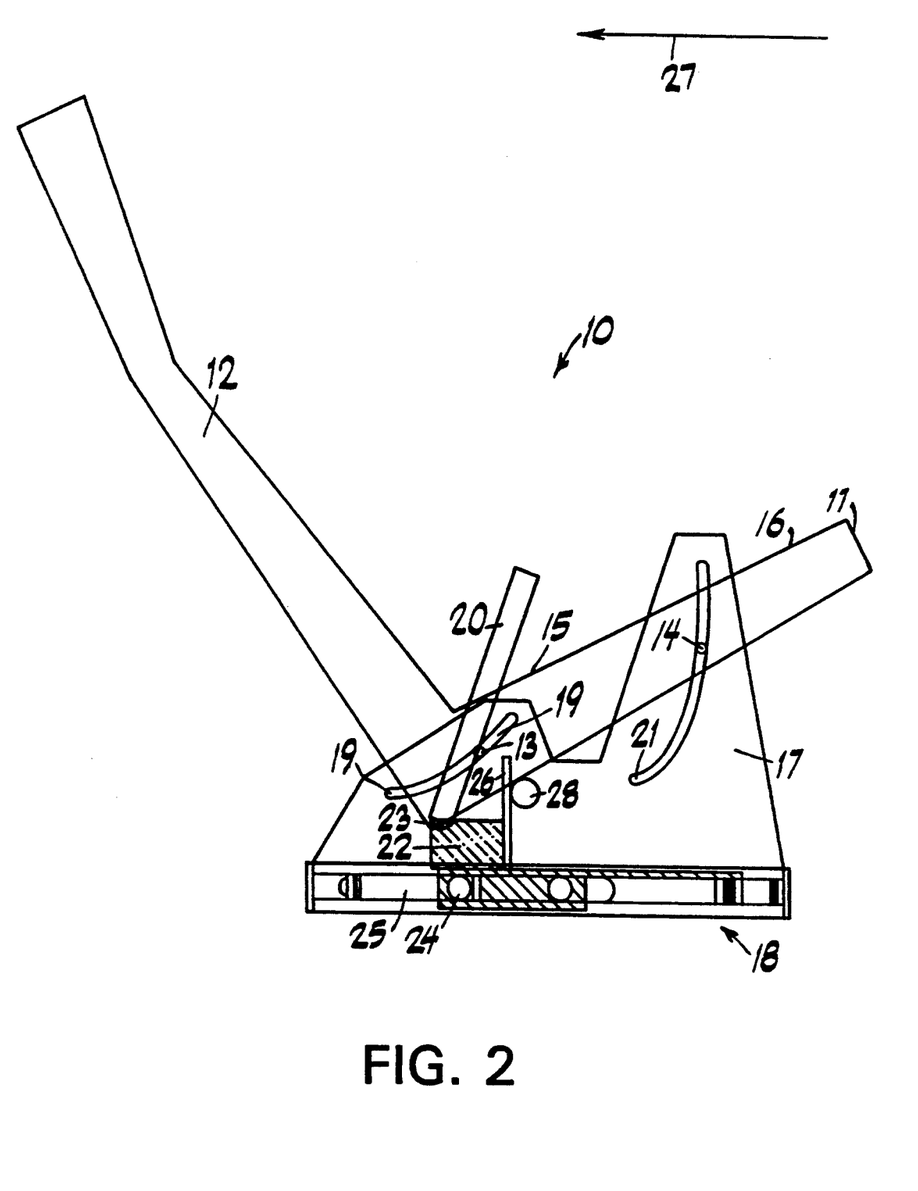
FIG. 2 shows a side view of a vehicle seat including an apparatus according to the first embodiment of the present invention, wherein the vehicle seat is in a second position in response to a sudden acceleration of the vehicle.
Figure 3:
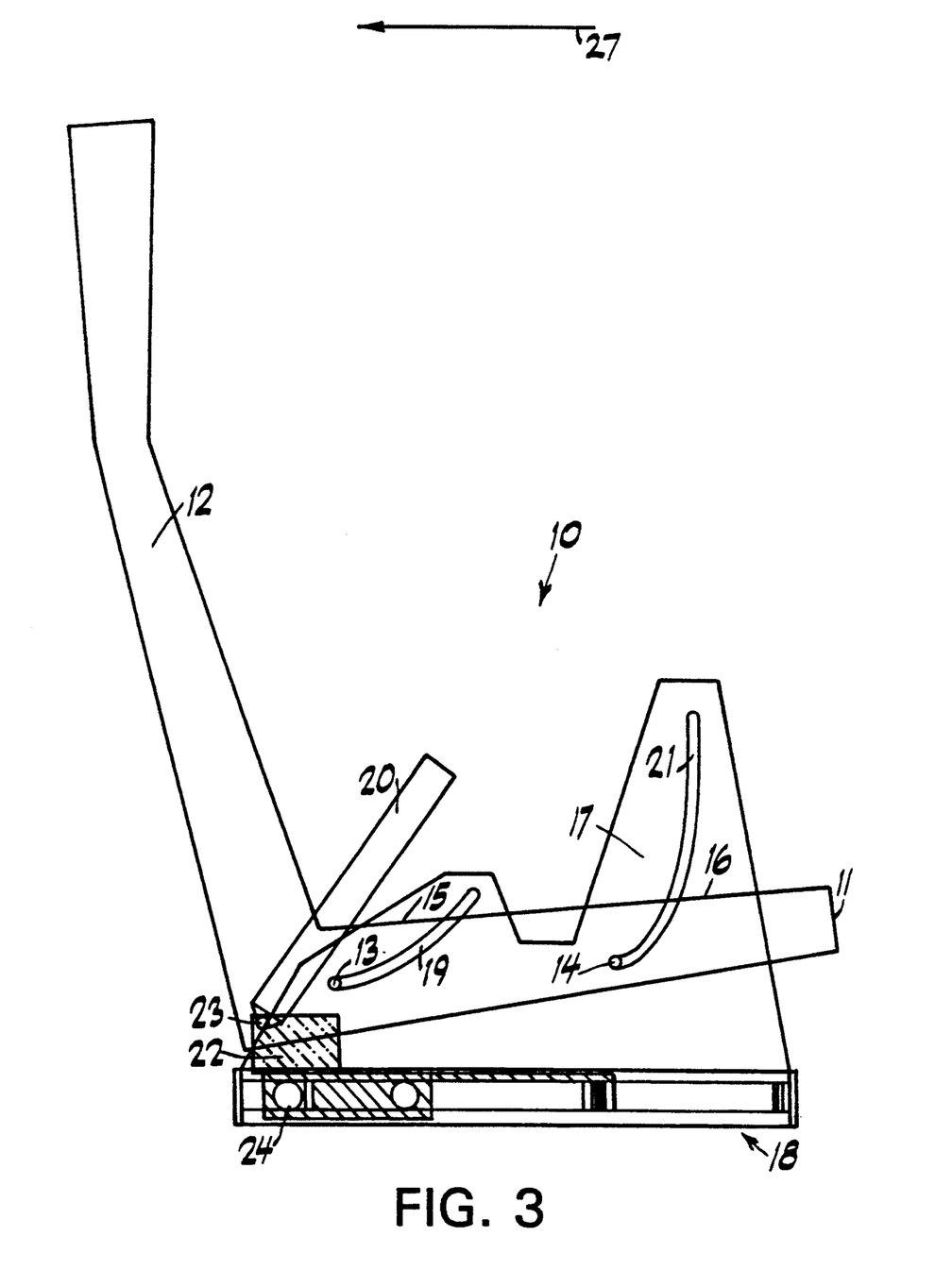
FIG. 3 shows a side view of a vehicle seat including an apparatus according to the second embodiment of the present invention, wherein the vehicle seat is in a rest position.
Figure 4:
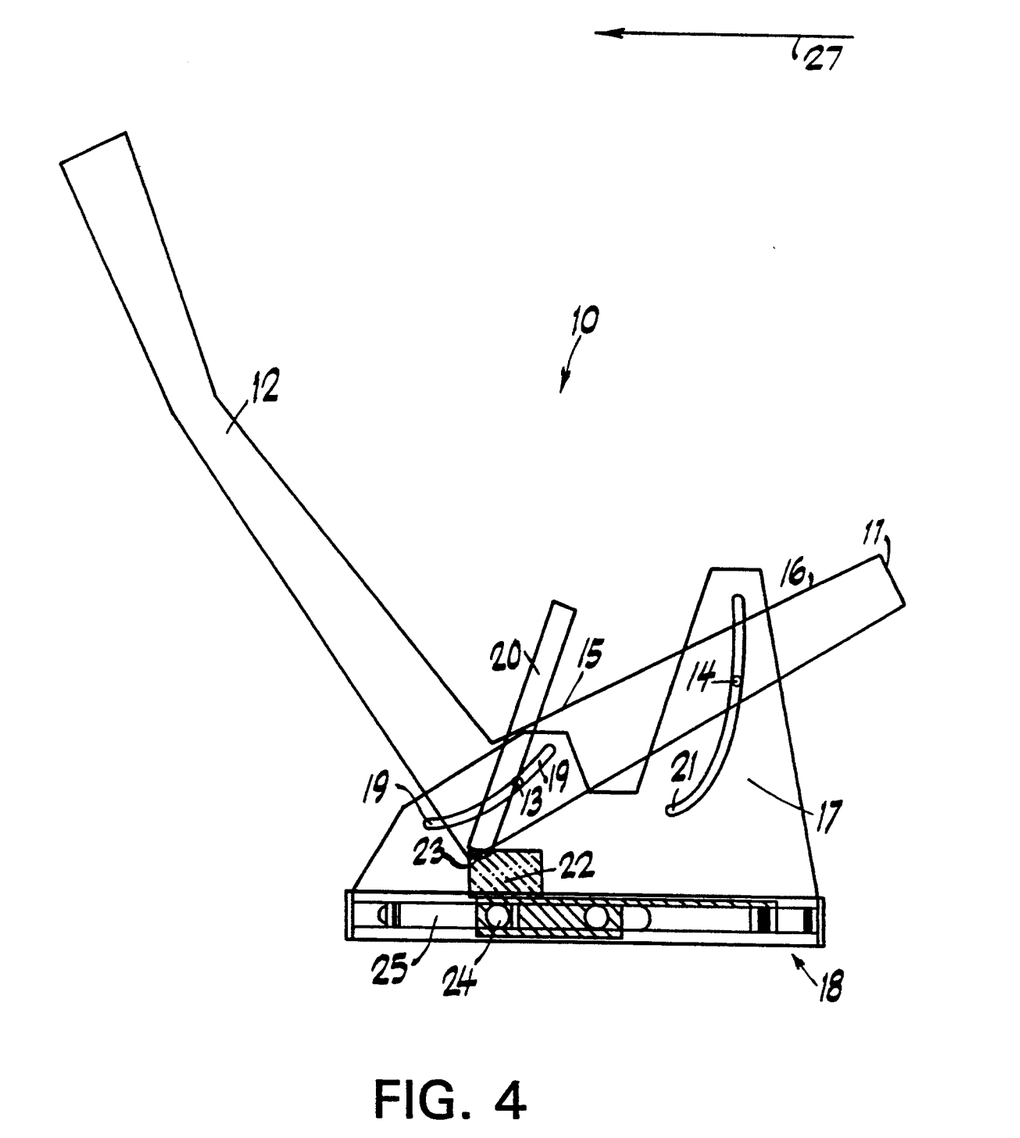
FIG. 4 shows a side view of a vehicle seat including an apparatus according to the second embodiment of the present invention, wherein the vehicle seat is in a second position in response to a sudden acceleration of the vehicle.

Referring to FIGS. 1 and 2, a vehicle seat indicated generally by the numeral 10 includes a seat base portion 11 and a seat back portion 12. A pin 13 is coupled to a rear portion 15 of the seat base 11 and a pin 14 is coupled to a forward portion 16 of the seat base 11. The pins 13 and 14 ride within slots 19 and 21, respectively, formed in a plate member 17. Thus, the seat 10 is movably mounted to the plate member 17 which is rigidly mounted to the vehicle frame 18. In addition, the seat 10 includes a restraining member 20 which is coupleable about a passenger and which is adjustable to a desired length, either manually or automatically, by means of mechanisms well known in the art. The restraining member 20 is coupled to a sliding member 22 by means of a pin 23. The sliding member 22 is coupled to a pin 24 which rides in a substantially horizontal slot 25 which is formed in the member 17. A contact member 26 coupled to the sliding member 22 abuts a rod 28 which is coupled to the seat base 11. In addition, any of various well known means may be provided which will impart a known resistance to the movement of the sliding member 22. This allows the design of a system which will provide a desired belt tightening and a desired seat motion for a given acceleration.

In operation, the seat 10 initially occupies a rest position wherein the pins 13 and 14 are located at the rearward ends of the slots 19 and 21, respectively. However, upon a sudden acceleration of the vehicle in the direction of arrow 27, the forward inertial force of the passenger exerts a force against the restraining member 20 which is translated to the sliding member 22 via the pin 23. The sliding member 22 and the contact member 26 are then moved forward in a direction opposite that of arrow 27. This, in addition to the forward momentum of the seat 10, causes the rod 28 and, consequently, the seat 10 to move such that the pins 13 and 14 ride forward and upward in slots 19 and 21, respectively.

Therefore, upon the sudden acceleration of the vehicle in the direction of arrow 27, the inertial force of the passenger is transmitted, via the restraining member 20 and the sliding member 22, to the seat 10 so that it contributes to a motion of the seat 10 wherein the forward portion 16 and the rear portion 15 of the seat base 11 move forward and upward with the forward portion 16 moving upward faster than the rear portion 15.

A vehicle seat including an apparatus according to a second embodiment of the present invention is shown in FIGS. 3–6. The apparatus according to this embodiment operates substantially as described in regard to the apparatus according to the first embodiment except that the sliding member 22 does not include a contact member for contacting a rod which is coupled to the seat. Thus, the apparatus according to this embodiment includes a moving seat and a belt tightening apparatus which operate substantially independently of one another. That is, the forward motion of the sliding member 22 does not induce a forward motion of the vehicle seat 10.

Figure 5:
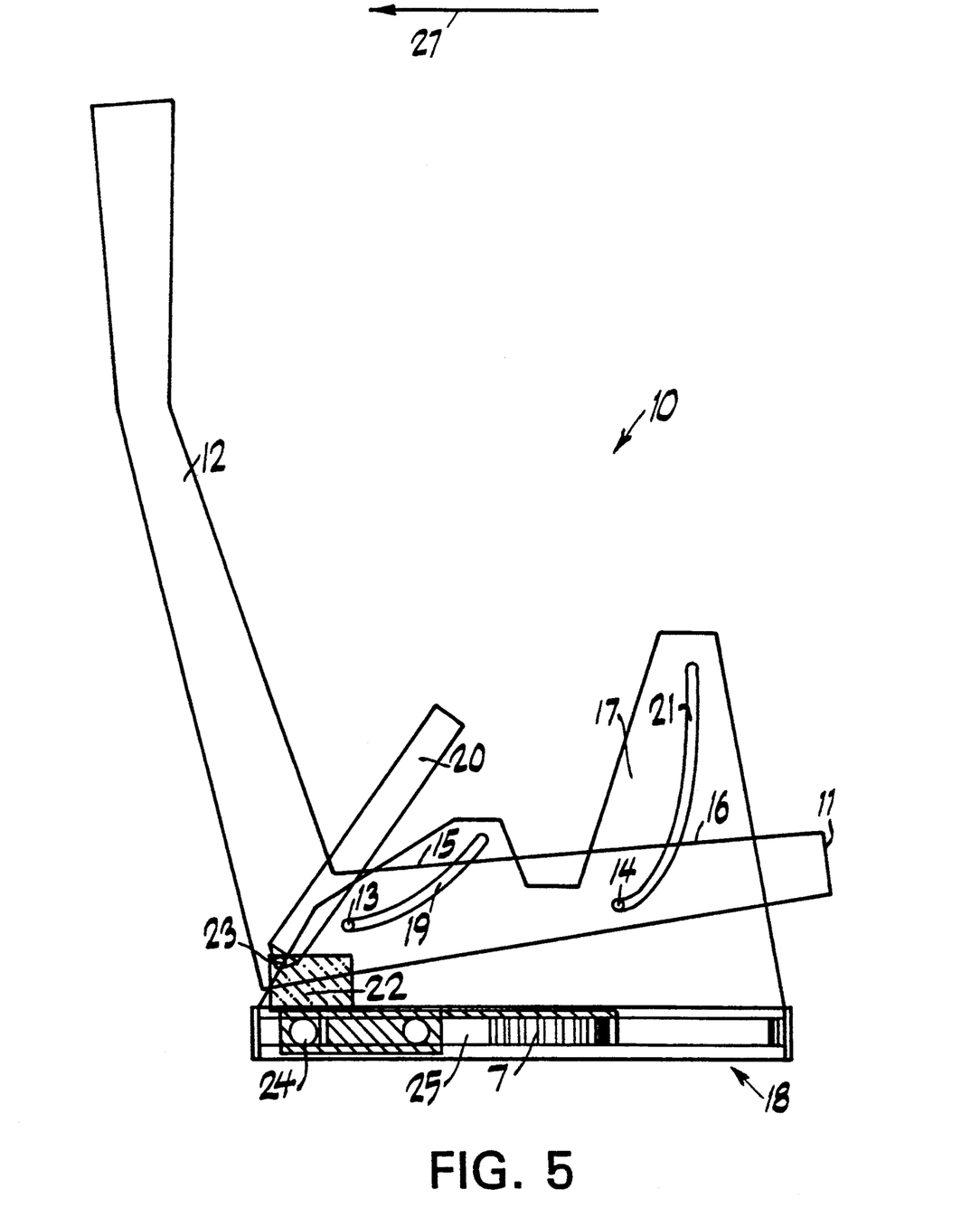
FIG. 5 shows a side view of a vehicle seat including an apparatus according to the second embodiment of the present invention wherein a slot in which the belt anchor is movably mounted further includes break away slats.
Figure 6:
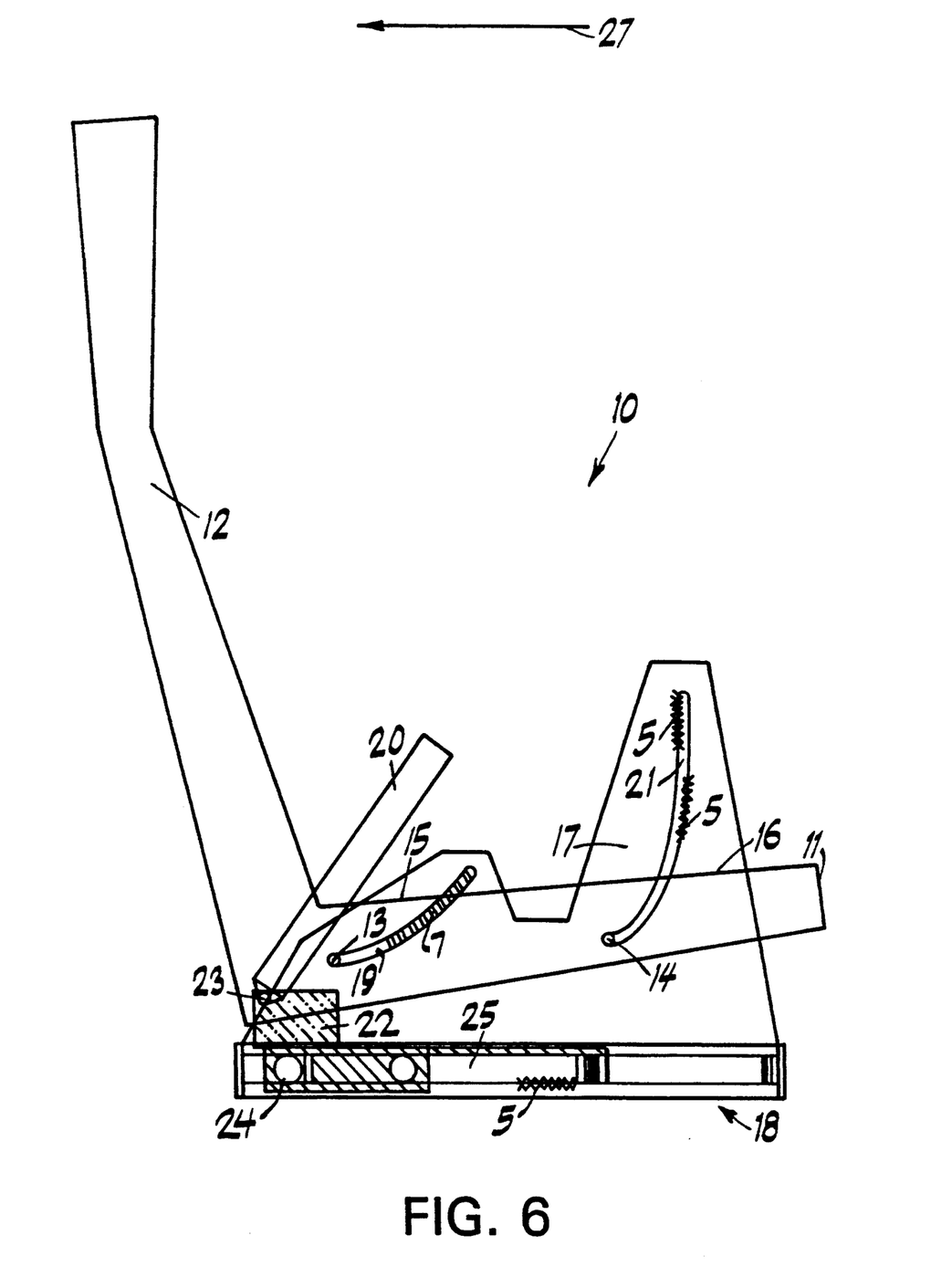
FIG. 6 shows a side view of a vehicle seat including an apparatus according to the second embodiment of the present invention wherein a slot in which the vehicle seat is movably mounted further includes break away slats.

In addition, as shown in FIGS. 5 and 6, the apparatus may include means for providing a predetermined resistance to the motion of either the vehicle seat 10 or the sliding member 22 away from their respective rest positions. The apparatus shown in FIG. 5 includes break-away slats 7 which are mounted in the slot 25. Thus, as the sliding member 22 and, consequently, the pin 24 move forward in the slot 25, a resistance to this motion is provided by the slats 7. Those skilled in the art will recognize that a desired resistance and, therefore, a desired belt tightening, may be obtained by altering the strength of the slats 7.

The apparatus shown in FIG. 6 includes break-away slats 7 in the slot 19. Similarly, these slats 7 provide a resistance to the forward motion of the seat 10. The apparatus of FIG. 6 also includes areas of increased friction, indicated generally by the numeral 5, along the slots 21 and 25. These areas of increased friction 5 provide a resistance to the forward motion of the seat via the pin 14 and to the motion of the sliding member 22 along the slot 25 via the pin 24. In addition, as the energy employed in overcoming the resistance provided by the break-away slats 7 and the areas of increased friction 5 is dissipated, the effects of any recoil on the passenger are reduced.

Figure 7:
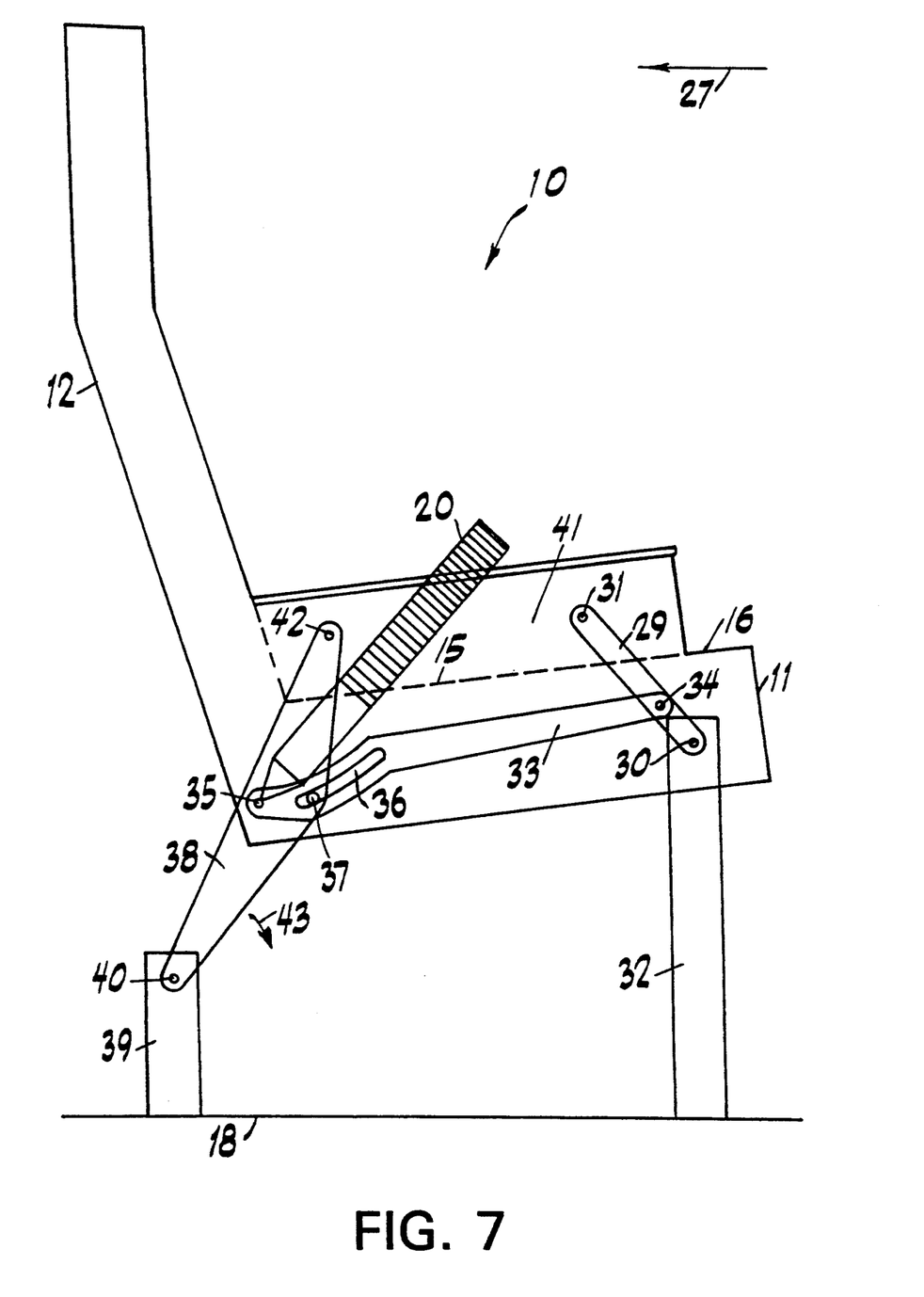
FIG. 7 shows a side view of a vehicle seat including an apparatus according to a third embodiment of the present invention, wherein the vehicle seat is in a rest position.
Figure 8:
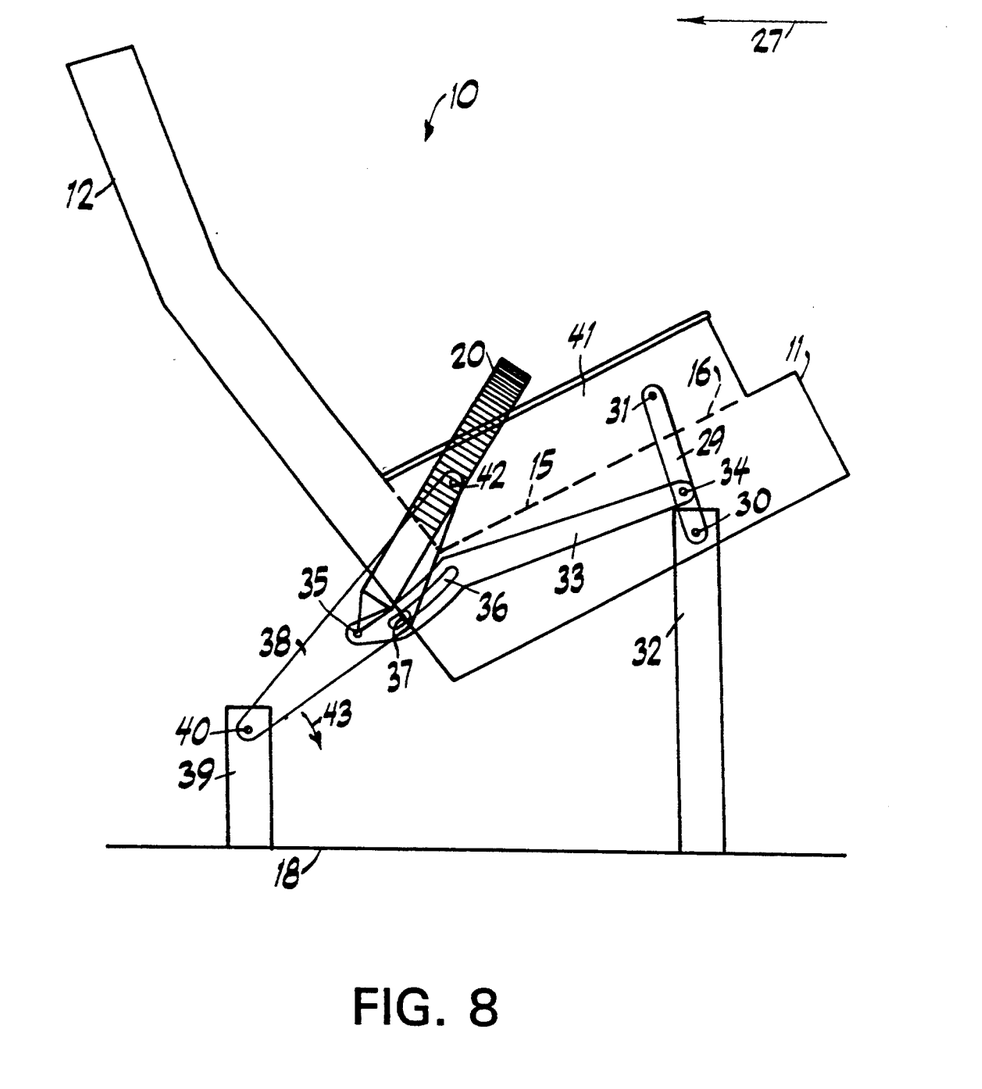
FIG. 8 shows a side view of a vehicle seat including an apparatus according to the third embodiment of the present invention, wherein the vehicle seat is in a second position in response to a sudden acceleration of the vehicle.

A vehicle seat 10 including an apparatus according to a third embodiment of the present invention is shown in FIGS. 7 and 8. The apparatus includes a bar 29, one end of which is rotatably coupled to the forward end of a plate member 41 by means of a pin 31. The plate member 41 is rigidly coupled to the seat back 12 and to the seat base 11. The other end of the bar 29 is rotatably coupled, by means of a pin 30, to a member 32 which is rigidly coupled to the frame 18. In addition, one end of a bar 33 is rotatably coupled to the bar 29 by means of a pin 34. The other end of the bar 33 is rotatably coupled to the restraining member 20 by means of a pin 35. An arcuate slot 36 formed in the bar 33 receives a pin 37 which is mounted on a plate member 38. One end of the plate member 38 is rotatably mounted by means of a pin 40 to a plate member 39 which is rigidly coupled to the vehicle frame 18 while the other end of the plate member 38 is rotatably coupled to the plate member 41 by means of a pin 42.

In operation, the seat 10 initially occupies a rest position as indicated by FIG. 7 wherein the pin 37 is located at the rearward end of the slot 36. Upon a sudden acceleration of the vehicle in the direction of arrow 27, the inertial force of the passenger exerts a force directed substantially forwardly against the restraining member 20. This force, which is translated to the bar 33 via the pin 35, urges the bar 33 forward causing the bar 29 to rotate clockwise as seen in FIG. 8. This forward movement of the upper part of the bar 29 draws the plate member 41 forward, consequently causing the plate member 38 to rotate in the direction of arrow 43 and the pin 37 to slide along the slot 36. This rotation of the plate member 38 draws the rearward end of the bar 33 downward thereby tightening the restraining member 20 about the passenger.

Thus, the inertial force of the passenger is transmitted via the restraining men, her 20, the bar 33 and the bars 29 and 41 such that the forward portion 16 of the seat base 11 moves forward and upward and the rearward portion 15 moves forward and downward as the motion of the seat simultaneously effects a predetermined tightening of the restraining member 20 about the passenger.

A vehicle seat 10 including an apparatus according to a fourth embodiment of the present invention is shown in FIGS. 9, 10, 11 and 12. The vehicle seat 10 is movably mounted to the vehicle frame 18 by means of two bars 44 and 45. The upper ends of bars 44 and 45 are rotatably coupled to the seat base 11 by means of pins 46 and 47, respectively. The lower end of the bar 44 is rotatably coupled to a plate member 48 by means of a pin 50 while the lower end of the bar 45 is rotatably coupled to a plate member 49 by means of a pin 51, wherein both plate members 48 and 49 are rigidly coupled to the vehicle frame 18. A first portion 54 of the restraining member 20 is coupled to a member 53 which is rigidly coupled to the frame 18. The first portion 54 extends from the member 53 across the seat back 12 to a pulley member 52. A second portion 54' of the restraining member extends from the member 53 across the seat back 12 to a pulley 52' located on the opposite side of the vehicle seat from the pulley 52. A third portion 57 of the restraining member 20 which extends around the pulley members 52 across the top surface 56 of the seat base 11 includes a buckle for selectively coupling the restraining member around the passenger. The buckle is adapted to receive a tongue member (not shown) which is coupled to a fourth portion 57' of the restraining member 20. The fourth portion of the restraining member extends around the pulley 52' to the top surface of the seat base 11. In addition, the apparatus includes means for adjusting the total length of the restraining member after it has been coupled about the passenger (not shown), either manually or automatically, as is well known in the art.

Figure 9:
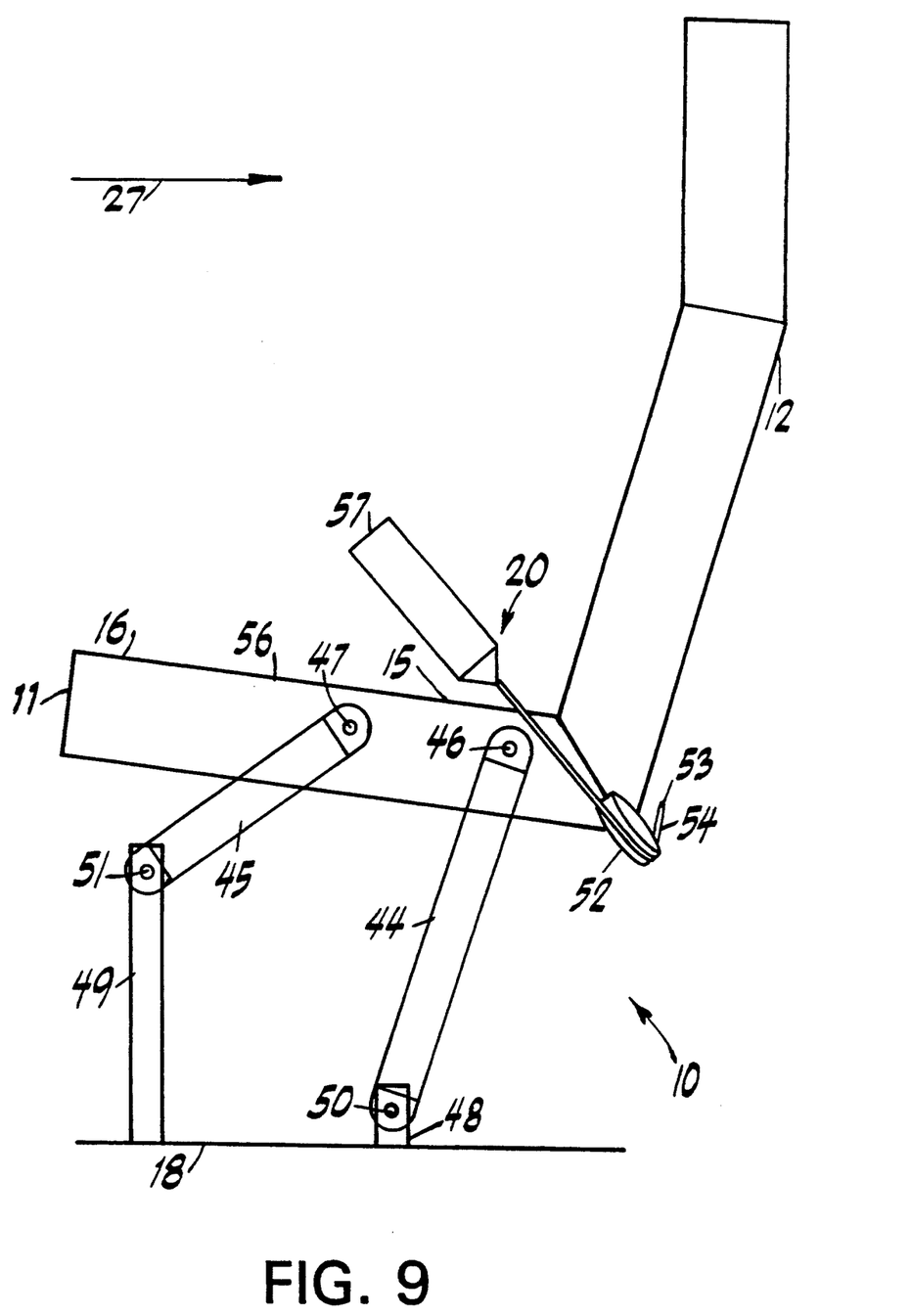
FIG. 9 shows a side view of a vehicle seat including an apparatus according to a fourth embodiment of the present invention, wherein the vehicle seat is in a rest position.
Figure 10:
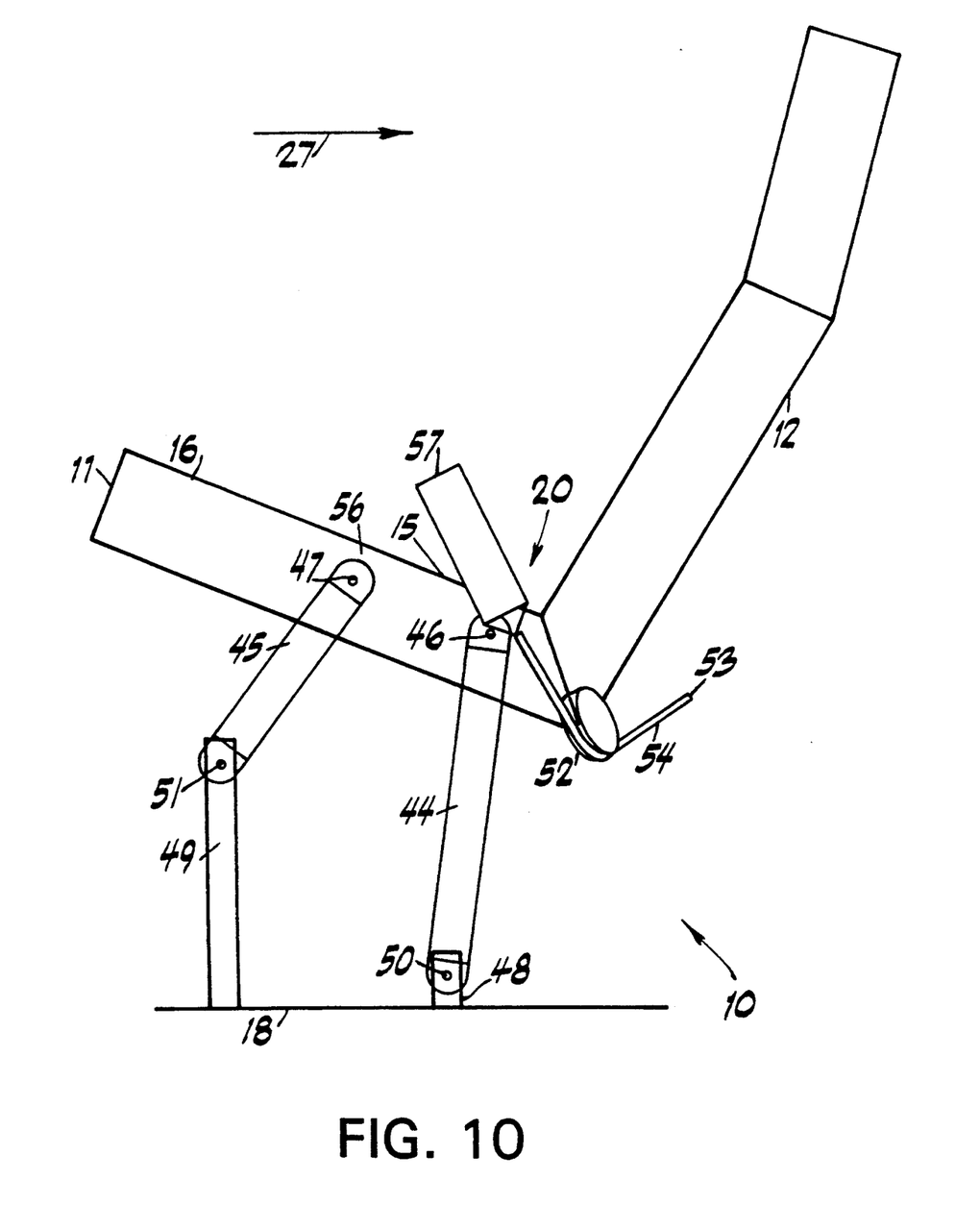
FIG. 10 shows a side view of a vehicle seat including an apparatus according to the fourth embodiment of the present invention, wherein the vehicle seat is in a second position in response to a sudden acceleration of the vehicle.
Figure 11:
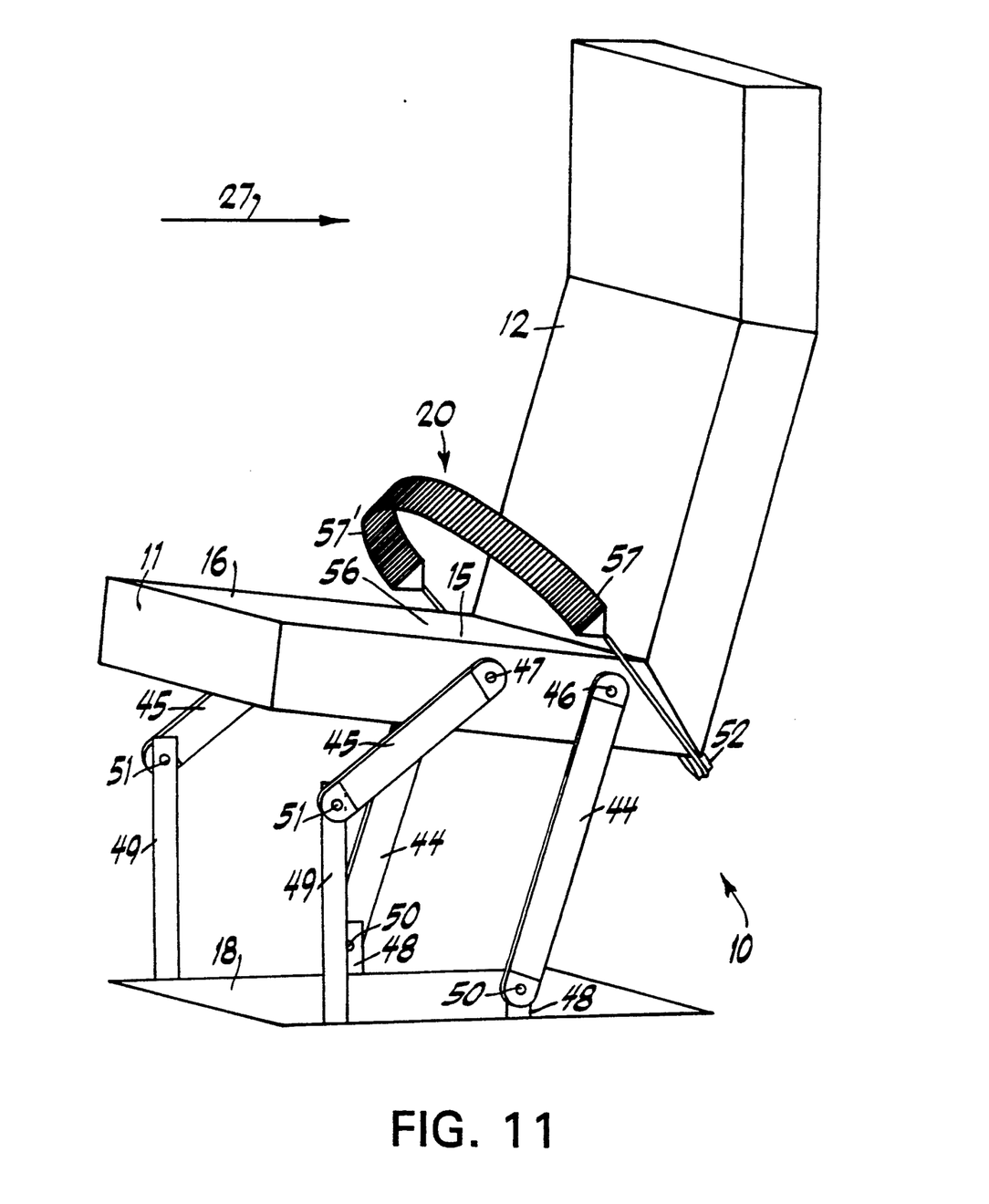
FIG. 11 shows a perspective view of a vehicle seat including an apparatus according to the fourth embodiment of the present invention wherein the vehicle seat is in a rest position.
Figure 12:
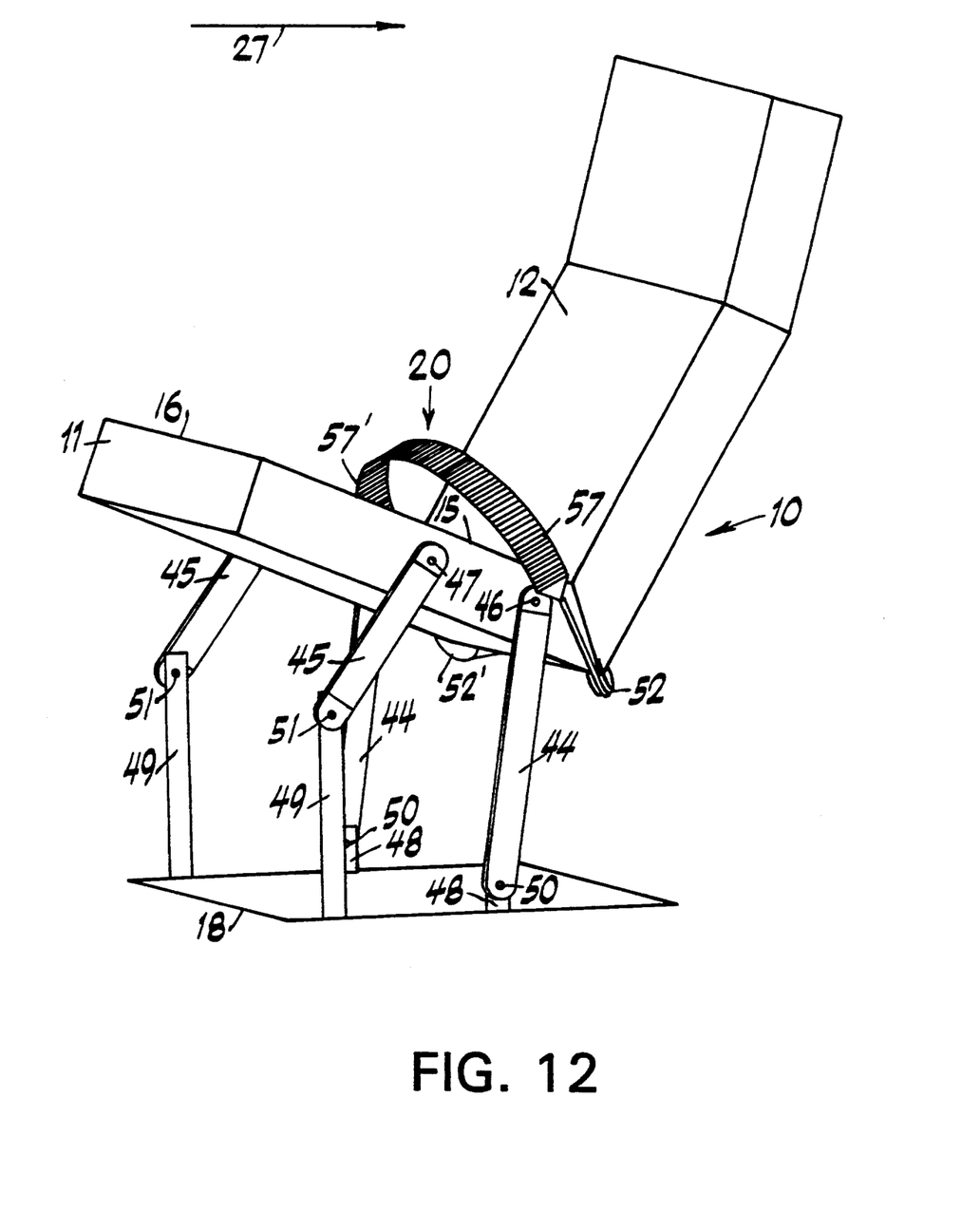
FIG. 12 shows a perspective view of a vehicle seat including an apparatus according to the fourth embodiment of the present invention wherein the vehicle seat is in a second position in response to a sudden acceleration of the vehicle.

In operation, the seat 10 initially occupies a rest position as shown in FIGS. 9 and 11. While in the rest position during normal travel of the vehicle, and after the restraining member 20 has been coupled around the passenger and the length of the restraining member 20 has been adjusted, the tension on the first and second portions 54 and 54' of the restraining member 20 remains substantially constant. However, upon the sudden acceleration of the vehicle, the inertial force of the passenger will exert a force on the restraining member 20 in a direction opposite arrow 27. This force increases the tension in the third and fourth portions 57 and 57', respectively. The tension in the first portion 54 and the second portion 54' is increased accordingly. The increase in tension in the first portion 54 and in the second portion 54' exerts a force on the pulley members 52 and 52' which urges the seat 10 to move forward in a direction opposite that of arrow 27, as shown in FIGS. 10 and 12. The pulley members 52 and 52' are chosen to impart a predetermined resistance to their rotation such that a desired belt tightening and a desired seat motion are attained.

Thus, the increased tension in the restraining member 20 due to the inertial force of the passenger results in a forward force on the seat 10 via the pulley members 52 and 52' which causes bar 44 to rotate forward about the pin 50 and bar 45 to rotate forward about the pin 51.

The seat base 11 therefore moves forward and upward such that the front portion 16 of the seat base 11 moves upward faster than the rear portion 15. This force transmitted through the restraining member 20 to the seat 10 is, of course, in addition to the inertial force of the seat 10 which will also urge the seat 10 forward in response to the sudden acceleration of the vehicle in the direction of the arrow 27.

Figure 13:
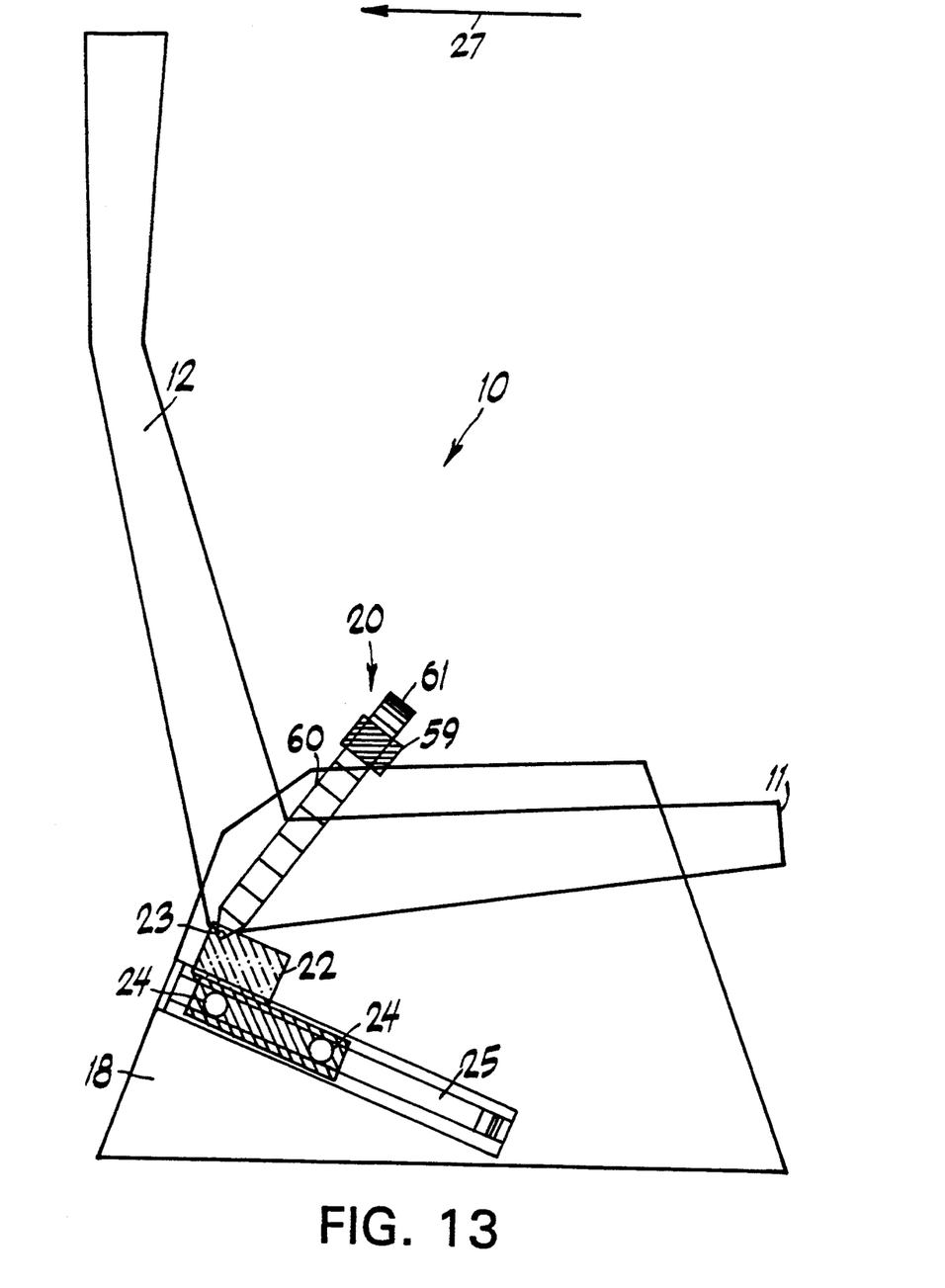
FIG. 13 shows a side view of a vehicle seat including an apparatus according to a fifth embodiment of the present invention.

A vehicle seat including an apparatus according to a fifth embodiment of the present invention is shown in FIG. 13. The seat 10 is coupled to the vehicle frame 18 such that it will not move in response to an acceleration of the vehicle. The apparatus includes a restraining member 20 which includes a buckle 59 for coupling a first portion 60 of the restraining member 20 to a second portion 61 as is well known in the art. The restraining member 20 extends across the seat base 11 and is coupled to a sliding member 22 by means of a pin 23. The sliding member 22 is movably mounted to the vehicle frame 18 by means of pins 24 which ride in a slot 25. In an initial position before a sudden acceleration of the vehicle, the sliding member 22 is located at the rearward end of the slot 25 adjacent the seat back 12. The slot 25 extends at an angle downward relative to the horizontal and forward from this initial position.

In response to a sudden acceleration of the vehicle in the direction of the arrow 27, the inertial force of the passenger is directed substantially forward in a direction opposite that of arrow 27 against the restraining member 20. This inertial force is transmitted via the restraining member 20 and the pin 23 to the sliding member 22. This force urges the sliding member 22 forward and, therefore, causes pins 24 to move away from the initial position along the slot 25. This draws the restraining member 20 downward and tightens the restraining member 20 about the passenger. Those skilled in the art will recognize that a desired amount of tightening of the restraining member 20 may be obtained by varying the angle of the slot 25 relative to the orientation of the top surface of the seat base 11.

Each of the above-described embodiments refers to a system for restraining a passenger in a vehicle seat wherein the vehicle is subject to a sudden acceleration. However, those skilled in the art will recognize that the present invention may be applied to reduce the injurious effects of a sudden acceleration upon any object during transportation or at any time during which the object may be subjected to injurious acceleration.

What is claimed is:

1. An apparatus for restraining a passenger in a vehicle comprising:

an anchor member movably coupled to the vehicle such that the anchor member may move along a predetermined path relative to the vehicle, said predetermined path including an anchor member rest position; and a restraining member selectively coupleable about the passenger to maintain the passenger in a vehicle seat, said restraining member being coupled to said anchor member such that, upon an acceleration of the vehicle of at least a predetermined magnitude, the anchor member moves away from the anchor member rest position along at least a portion of the predetermined path, wherein the path is oriented so that the restraining member is gradually tightened about the passenger as the anchor member moves further from the anchor member rest position, and wherein an inertial force of the passenger is transmitted to the anchor member via the restraining member so that the inertial force of the passenger contributes to the motion of the anchor member.

2. An apparatus according to claim 1 wherein the seat moves away from a seat rest position in response to the predetermined acceleration.

3. An apparatus according to claim 2 wherein, upon the predetermined acceleration, the inertial force of the passenger is transmitted via the restraining member to said anchor member and subsequently to the seat, so that the inertial force of the passenger contributes to the motion of the seat.

4. An apparatus according to claim 2, wherein the seat motion contributes to the restraint of the passenger.

5. An apparatus according to claim 4, wherein the motion of the seat and the motion of the anchor member act in synchronization to effect an enhanced restraint of the passenger.

6. An apparatus according to claim 2 wherein, upon the predetermined acceleration, the inertial force of the vehicle seat is transmitted via the motion of the seat to said anchor member so that the inertial force of the vehicle seat contributes to the motion of the anchor member at least partly in the direction of the inertial force and, consequently, the inertial force of the vehicle seat contributes to the tightening of the restraining member.

7. An apparatus according to claim 2 wherein the predetermined path is oriented such that the anchor member moves substantially horizontally and forwardly from the anchor member rest position and wherein the seat moves forwardly and upwardly away from the seat rest position in response to the predetermined acceleration.

8. An apparatus according to claim 7 wherein the anchor member includes a contacting surface for contacting a member coupled to the seat, the contacting surface abutting the member when the anchor member and the seat are in their respective rest positions, and wherein motion of the anchor member away from the anchor member rest position induces motion of the member and consequently, contributes to the motion of the seat.

9. An apparatus according to claim 7 further comprising a rigid member coupled to the vehicle frame, said rigid member including a substantially horizontal slot formed therein, and wherein the anchor member includes a pin which is received in the slot which is formed in the rigid member.

10. An apparatus according to claim 1 further comprising means for providing a predetermined resistance to the motion of said anchor member along the predetermined path.

11. An apparatus according to claim 10 wherein said means for providing resistance to the motion of said anchor member dissipates at least a portion of the kinetic energy of the passenger.

12. An apparatus according to claim 11 wherein the seat moves away from a seat rest position in response to the predetermined acceleration, the apparatus further comprising means for providing a predetermined resistance to the motion of the seat.

13. An apparatus according to claim 12 wherein said means for providing resistance to the motion of the seat dissipates at least a portion of the kinetic energy of the passenger.

14. An apparatus according to claim 10 wherein the means for providing resistance includes break away slats arranged along the predetermined path.

15. An apparatus according to claim 10 wherein the means for providing resistance includes areas of increased friction arranged along the predetermined path.

16. An apparatus according to claim 2 wherein the restraining member includes a first portion and a second portion, each portion extending forward from a rearward end coupled to the vehicle frame around a respective pulley member to a forward end, said forward ends of the respective portions including means for coupling the first and second portions of the restraining member together to restrain a passenger seated in the vehicle seat.

17. An apparatus according to claim 2, wherein the vehicle seat is movably coupled to the vehicle frame by a rearward seat supporting member and a forward seat supporting member, the rearward and forward supporting members each including at a lower end thereof, a pin rotatably mounted to the vehicle frame, an upper end of each of the rearward and forward supporting members being rotatably coupled to the seat, wherein the apparatus further includes a linking member a forward end of which is rotatably coupled to the forward seat supporting member, the restraining member being coupled to the linking member at a point rearward of the forward end of the linking member.

18. An apparatus according to claim 1 wherein the predetermined path is a substantially linear path.

19. An apparatus according to claim 1 wherein the predetermined path is substantially a conic section.

20. An apparatus according to claim 1 wherein the predetermined path extends substantially downward in a direction away from the anchor member rest position.

21. An apparatus according to claim 1 wherein the predetermined path is oriented such that the elevation of the anchor member increases as the anchor member moves further from the anchor member rest position.

22. An apparatus according to claim 1 further comprising a plurality of anchor members, each being coupled to the restraining member and wherein each anchor member moves along a respective predetermined path.

23. An apparatus according to claim 2 further comprising a restraining member locking means which operates to lock the restraining member such that the length of the restraining member coupled around the passenger's body is fixed when tension in the restraining member is above a predetermined tension, said locking means allowing the length of the restraining member to be extended freely when the tension in the restraining member is below the predetermined tension.

24. An apparatus according to claim 23 wherein the predetermined tension is fixed so that, upon motion of the seat in response to the predetermined acceleration, said locking means allows a predetermined amount of extension of the restraining member before locking.

25. An apparatus according to claim 1 further comprising break away slats arranged along the predetermined path in order to provide a predetermined resistance to the movement of the anchor member.

26. An apparatus according to claim 1 further comprising areas of increased friction arranged along the predetermined path in order to provide a predetermined resistance to the movement of the anchor member.

27. An apparatus for restraining an object comprising:

an anchor member movably coupled to a frame; and
a restraining member selectively coupleable about the object to maintain the object on an object support structure, said restraining member being coupled to said anchor member such that, upon an acceleration of the frame of at least a predetermined magnitude, the anchor member moves away from a rest position along at least a portion of a predetermined path at least partly in the direction of the inertial force of the object so that the restraining member is gradually tightened about the object as the anchor member moves further from the rest position, wherein the inertial force of the object is transmitted to the anchor member via the restraining member so that the inertial force of the object contributes to the motion of the anchor member.

* * * * *